June 2, 1964 D. A. MacLEOD 3,135,833

TRANSMISSION LOSS PAD CONTROL SYSTEM

Filed May 25, 1962 4 Sheets-Sheet 1

INVENTOR
D. A. MacLEOD
BY John C Albrecht
ATTORNEY

TRANSMISSION LOSS PAD CONTROL SYSTEM

INVENTOR
D.A. MacLEOD
BY John C Albrecht
ATTORNEY

INVENTOR
D.A. MacLEOD
BY John C Albrecht
ATTORNEY

TRANSMISSION LOSS PAD CONTROL SYSTEM

Filed May 25, 1962

INVENTOR
D.A. MacLEOD
BY John C Albrecht
ATTORNEY

United States Patent Office
3,135,833
Patented June 2, 1964

3,135,833

TRANSMISSION LOSS PAD CONTROL SYSTEM

Donald A. MacLeod, Oakland, Calif., assignor to American Telephone and Telegraph Company, New York, N.Y., a corporation of New York Filed May 25, 1962, Ser. No. 197,653
17 Claims. (Cl. 179—16)

This invention relates in general to automatic telephone switching systems and more particularly to the automatic control of transmission loss pads in such systems.

Transmission loss pads and their use to control transmission levels over long distance telephone connections are well known. It is the practice to use such pads at only the terminal switching points of a call connection and to disable them at intermediate tandem switching locations to produce proper transmission levels.

Many telephone trunks may be used either as terminal or intermediate segments of a multitrunk long distance call connection. Most telephone systems provide controllable transmission loss pads in association with all such trunks. When a trunk is used as a terminal segment of a multitrunk call connection, the associated transmission loss pad remains enabled. However, when a trunk is used as an intermediate segment of a multitrunk call connection, the associated transmission loss pad is disabled to avoid improper levels of transmission.

The control of the disablement of transmission loss pads has generally been effected by control signals over the talking conductors of a trunk circuit or over a simplex circuit between the talking conductors of the trunk circuit. Various types of control signals have been used, including high and low resistance ground signals, polarity reversals between the talking conductors and straightforward direct current application to one or both of the talking conductors. Relay circuits including marginal, polarized, differential and sensitive relays have been used to detect the various types of pad control signals. These pad control circuits usually include auxiliary slave relays which forward pad disconnect signals in response to the operation or release of the above-mentioned detection relays.

The present general tendency toward the miniaturization of telephone switching equipment reflects the physical space problems encountered in the installation of such equipment. It is advantageous to provide equipment which will require a minimum of central office or PBX space. The previously mentioned pad control circuits, each of which contains a number of relays, necessarily occupy considerable relay rack space.

It is a general object of this invention to provide an arrangement for automatically controlling transmission loss pads which occupies a minimum of physical space.

The prevalent use of the talking conductors of a trunk to provide a pad control circuit in automatic switching systems is due to several considerations, among which are a desire to avoid the addition of extra control leads where possible and the necessity of remaining within the critical resistance limitations of the existing sleeve conductor control lead. This is particularly true in the well known step-by-step switching system.

The sleeve conductor, a single control lead which usually parallels the talking conductors through the switching train of a central office, provides equipment busy indications to equipment hunting circuits and serves as a supervisory holding circuit for the switching train components during a call. When the resistance limit of the sleeve conductor is exceeded, false disconnect indications and equipment hunting errors result. It is therefore necessary in step-by-step switching systems to maintain the low resistance limit of the sleeve conductor and, consequently, it has not been desirable to substantially increase its resistance by inserting the windings of extraneous control relays in series therewith.

The use of the talking conductors of a trunk for other than call transmission purposes may introduce possible transmission impairment. It is, therefore, desirable to avoid the use of the talking conductors of a trunk for switching control functions whenever possible.

It is, therefore, a further object of the invention to provide a transmission loss pad control arrangement wherein pad control is effected over a signaling circuit divorced from the talking conductors of a trunk without the addition of new control leads.

Many of the trouble conditions encountered in electromechanical switching systems result from circuit interruptions by relay contact misalignment, dirty relay contacts or other mechanical failures of relays. These and other problems inherent in electromechanical circuits may be eliminated by utilizing electronic elements for switching purposes.

It is, therefore, another object of this invention to provide an arrangement for controlling transmission loss pads wherein electronic switching elements are used and the use of electromechanical switching devices is minimized.

These and other objects of the invention are attained in one specilc illustrative embodiment of the invention wherein a transistor is placed in series with the sleeve conductor leg extending from a two-way trunk circuit to the switching equipment used to complete the outgoing portion of a tandem call connection. In response to the detection of current flow in this sleeve conductor leg the transistor initiates the disconnection of a normally connected transmission loss pad from the talking conductors of the trunk. Those sleeve conductor legs extending from the trunk circuit to switching equipment used in completing an incoming or an outgoing call connection bypass the transistor, thereby allowing the transmission loss pad to remain connected.

The incoming portion of a tandem call connection extends from a two-way trunk circuit to an associated incoming selector switch. In response to call information incoming over the trunk, the incoming selector switch selects a level corresponding to a route to the called destination. If the call destination is in another central office, a high resistance ground is applied to a control lead extending from the incoming selector to the trunk circuit. The trunk circuit, in response to the high resistance ground, initiates the disconnection of an associated transmission loss pad from the talking conductors of the trunk. If the call destination is an operator at the local central office, a low resistance ground is applied to the same control lead. The trunk circuit, in response to the low resistance ground, switches the call directly to an operator and disconnects the associated incoming selector circuit.

In accordance with one feature of this invention a current sensitive electronic device is placed in series with the sleeve conductor leg extending from the bank terminals of incoming selectors to a two-way trunk circuit to detect current flow in the sleeve conductor leg and to initiate the disconnection of a normally connected transmission loss pad from the talking conductors of the trunk during calls completed through an incoming selector bank trunk termination.

In accordance with another feature of this invention the resistance of the current sensitive electronic device is sufficiently low to allow its insertion in series with the sleeve conductor without exceeding the resistance limit thereof.

In accordance with another feature of this invention a current sensitive electronic device is placed in series with the sleeve conductor leg extending from a trunk circuit to the associated through-jack termination on a local switchboard to detect current flow in the sleeve conductor leg and initiate the disconnection of a normally connected transmission loss pad from the talking conductors of the trunk during calls completed by way of the through-jack trunk termination.

In accordance with another feature of the invention a voltage responsive zener diode is included in series with one leg of a control lead extending from the normal post spring contacts of an incoming selector circuit to the associated trunk circuit to distinguish between signals indicatcating tandem and operator calls.

A more complete understanding of this invention and of these and other features thereof may be gained from the following description when read in connection with the accompanying drawing in which.

GENERAL DESCRIPTION

Figure 6:
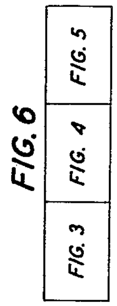
FIG. 6 shows the arrangement of FIGS. 3 through 5.
Figure 1:
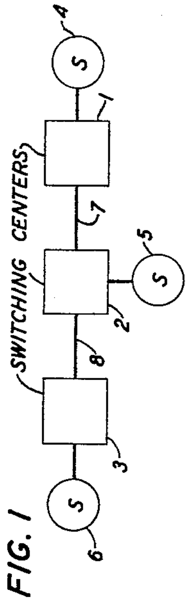
FIG. 1 is a block diagram of a network of step-by-step switching centers.

FIG. 1 shows a network of step-by-step switching centers 1, 2, and 3, each of which serves a plurality of subscriber stations represented by stations 4, 5, and 6. Switching centers 1 and 2 are connected by a four-wire trunk 7 and switching centers 2 and 3 are connected by a four-wire trunk 8.

The circuit operations of a step-by-step switching center in establishing incoming, outgoing, and tandem call connections are well known in the telephone art and will be described in only the most general terms hereinbelow. A more complete description of switching operations in this type of switching center may be found on pages 53 to 67 inclusive of the second edition of "Automatic Telephony" by Smith and Campbell.

*Tandem Call Connection—Automatic Completion*

A call originated by station 4 at switching center 1 which is directed to station 6 at switching center 3 is switched on a tandem basis through switching center 2, in which a tandem call connection is established between trunks 7 and 8.

Figure 2:
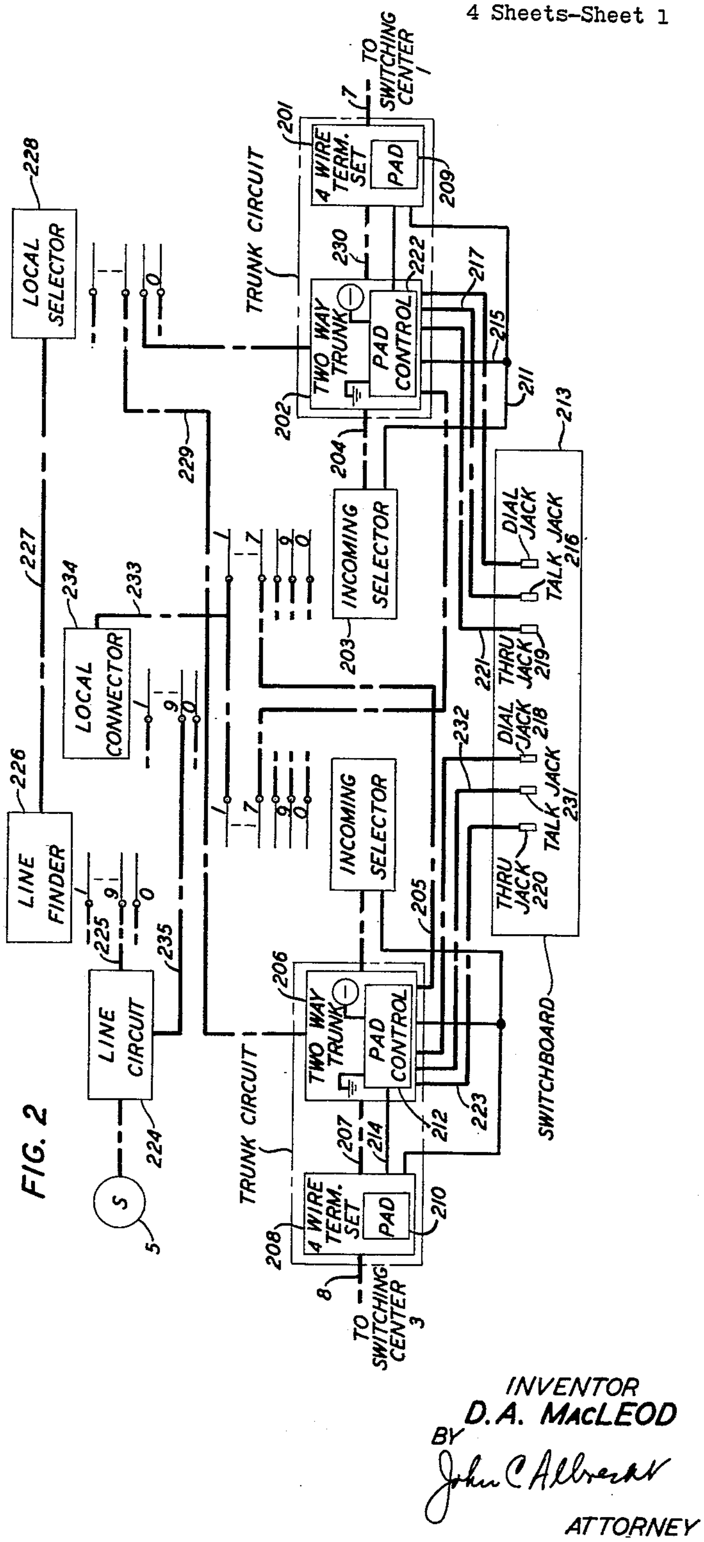
FIG. 2 is a block diagram of a typical step-by-step switching center in which my invention is incorporated.

FIG. 2 shows in block diagram form some of the equipment components of the switching train at switching center 2. Assuming that this call is switched automatically without operator assistance at switching center 2, the call enters switching center 2 over trunk 7 through four-wire termination set 201 and two-way trunk 202 and is connected through cable 204, incoming selector 203, cable 205, two-way trunk 206, cable 207 and four-wire termination set 208 to trunk 8.

To provide proper transmission levels, the transmission loss pad 209 associated with trunk 202 and the transmission loss pad 210 associated with trunk 206 are disconnected. The disconnection of pad 209 from trunk 202 is effected from incoming selector 203 which, in response to call information received through trunk 202, selects a level associated with trunk 206 and generates a pad-disconnect signal over lead 211 to four-wire termination set 201 causing the pad 209 to be disconnected from the tip and ring conductors of trunk 202.

The disconnection of pad 210 from trunk 206 is effected over the sleeve conductor leg of trunk 206, which is included in cable 205. Cable 205, which connects the trunk 206 with bank terminals of incoming selector 203, includes the tip and ring conductors of trunk 206 in addition to the associated sleeve conductor leg. Trunk 206, in response to seizure by incoming selector 203, connects ground through pad control circuit 212 to the sleeve conductor leg in cable 205. This ground is extended over the sleeve conductor leg in cable 205 through incoming selector 203 and cable 204 to battery in trunk 202, causing current to flow through the sleeve conductor leg in cable 205. The ground is also extended over the other sleeve conductor legs of trunk 206 serve as a trunk busy indication to the switchboard 213 and to other selectors. In response to the detection of current flow in the sleeve conductor leg in cable 205, pad control circuit 212 signals four-wire termination set 208 over lead 214 to disconnect transmission loss pad 210 from the tip and ring conductors of trunk 206.

*Tandem Call Connection—Operator Assisted*

It is now assumed that the call from station 4 to station 6 is switched in switching center 2 by an operator at switchboard 213. The incoming selector 203, in response to call information received through trunk 202, selects a level corresponding to an operator request call. Incoming selector 203 then returns an operator-request signal over leads 211 and 215 to trunk 202 and to four-wire termination set 201, respectively. Four-wire termination set 201, in response to the operator-request signal, disconnects pad 209 from the tip and ring conductors of trunk 202. Trunk 202, in response to the operator-request signal, alerts the talk-jack appearance 216 of the trunk 202 on switchboard 213 through cable 217 and disconnects itself from incoming selector 203. The disconnection of trunk 202 from incoming selector 203 removes the operator-request signal from lead 211 thereby signaling four-wire termination set 201 to reconnect pad 209.

The operator at switchboard 213 answers the call in response to an alerting lamp indication at talk-jack 216. Upon ascertaining the call destination, which is station 6 at switching center 3, the operator selects an idle trunk 206 to switching center 3 and seizes the selected trunk 206 in the well known manner through the dial-jack appearance 218 of trunk 206. The operator then dials the desired number and, using another cord, connects the trunk 202 to the trunk 206 by way of their through-jack appearances 219 and 220, respectively.

It is now necessary to disconnect the transmission loss pads 209 and 210 from the tip and ring conductors of trunks 202 and 206, respectively, to avoid introducing improper transmission levels in the call connection. The disconnection of pad 209 is effected over the sleeve conductor leg of trunk 202 in cable 221. Cable 221 includes the tip and ring conductors of trunk 202 in addition to the associated sleeve conductor leg. In connecting trunk circuits 202 and 206, the operator at switchboard 213 applies ground, in the well known manner, to the sleeve conductor leg associated with the through-jack appearance 219 of trunk 202. The sleeve conductor leg included in cable 221 is extended through pad control circuit 222 to battery in trunk 202. Current therefore flows through the sleeve conductor leg. Pad control circuit 222, upon detecting the current flow in the sleeve conductor leg in cable 221, signals four-wire termination set 201 to disconnect pad 209 from the tip and ring conductors of trunk 202. Pad 210 is disconnected from the tip and ring conductors of trunk 206 in a similar manner responsive to the connection of ground by the operator to the sleeve conductor leg in cable 223 at through-jack 220.

*Locally Originating Call*

Calls which terminate or originate in switching center 2 require that the transmission loss pad associated with the trunk over which the call enters or leaves switching center 2 remain connected to the trunk.

A call originated by station 5 directed to station 6 is switched by switching center 2 through line circuit 224, cable 225, line finder 226, cable 227, local selector 228, cable 229, trunk 206, cable 207, four-wire termination set 208 and trunk 8 to switching center 3, which serves the called station 6. As previously described, trunk 206, in response to its seizure by a selector, applies ground through pad control circuit 212 to its sleeve conductor legs. The sleeve conductor leg included in cable 229 extends through the above-described connection to battery in line circuit 224. Current therefore flows through the sleeve conductor leg of cable 229; however current does not flow through the sleeve conductor leg in cable 205. Pad control circuit 212 distinguishes between the previous current flow in the sleeve conductor leg in cable 205 and the present current flow in the sleeve conductor leg in cable 229, and does not initiate a pad-disconnect signal. The pad 210 therefore remains connected to the tip and ring conductors of trunk 206.

If the call to station 6 from station 5 is completed through switchboard 213 by an operator, only the talk-jack 231 associated with the trunk 206 is used. Ground is connected to the sleeve conductor leg included in cable 232 and is extended from the talk-jack 231 through cable 232 to trunk 206 and through the pad control circuit 212 to battery. Pad control circuit 212 distinguishes between the present current flow in the sleeve conductor leg in cable 232 and the previous current flow in sleeve conductor leg in cable 223 and does not generate a pad-disconnect signal. Pad 210 therefore remains connected to the tip and ring conductors of trunk 206.

*Locally Terminating Call*

A call directed to station 5 from station 4 is switched by switching center 2 from the trunk 7 through four-wire termination set 201, cable 230, trunk 202, cable 204, incoming selector 203, cable 233, local connector 234, cable 235, and line circuit 224 to called station 5. No pad-disconnect signal is generated by incoming selector 203 in response to the selection of a level associated with local connector 233 and pad 209 therefore remains connected to the tip and ring conductors of trunk 202.

If the call to station 5 from station 4 is completed through the switchboard 213 by an operator, only the talk-jack 216 of the associated trunk 202 is used, and the pad 209 associated with trunk 202 remains connected.

DETAILED DESCRIPTION

Figure 3:
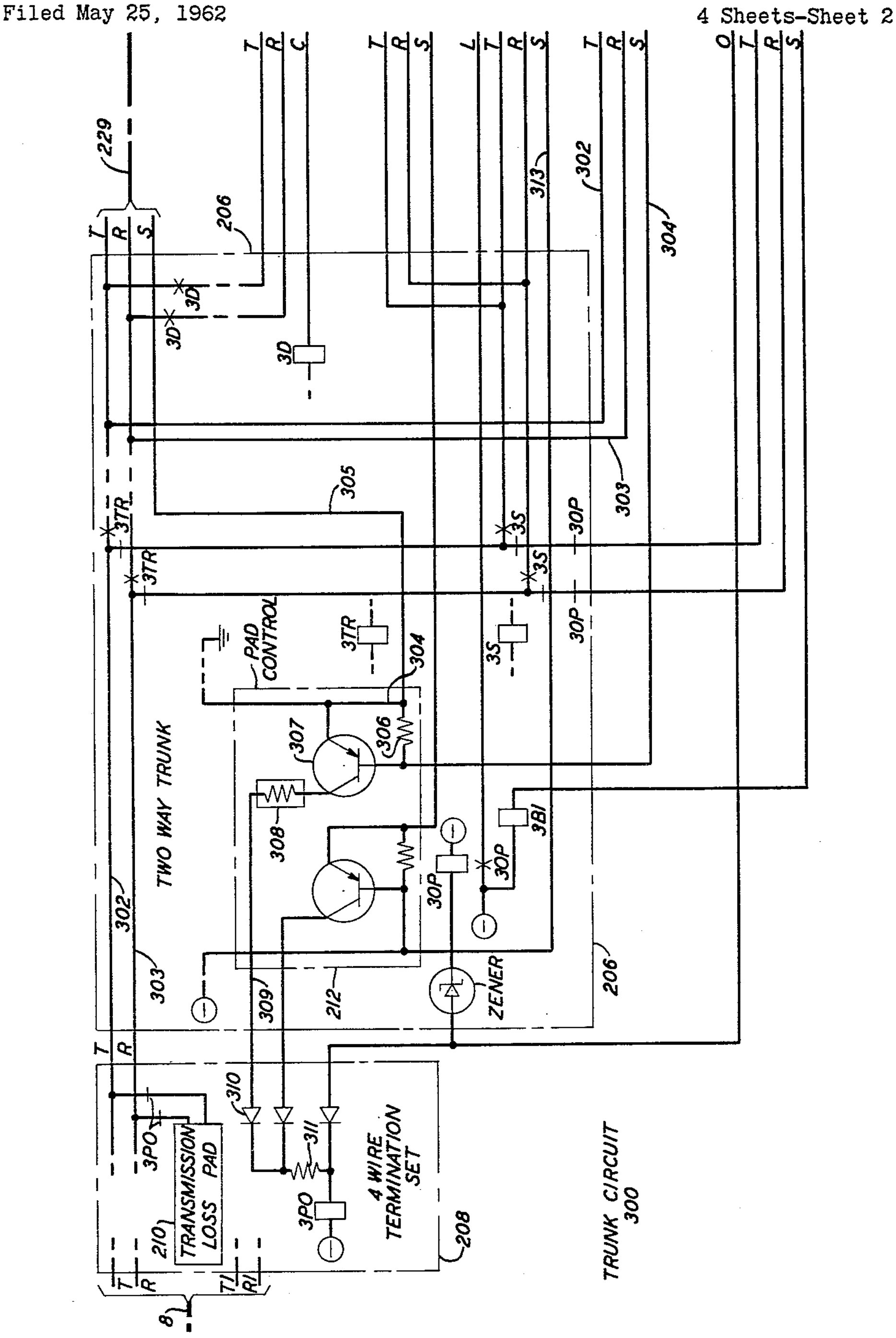
FIGS. 3 through 5 are a skeletonized schematic representation in detached contact and block diagram form of the switching center shown in FIG. 2 including a line circuit, a line finder, a local selector, incoming selectors, a local connector, a switchboard and typical two-way trunk circuits.
Figure 4:
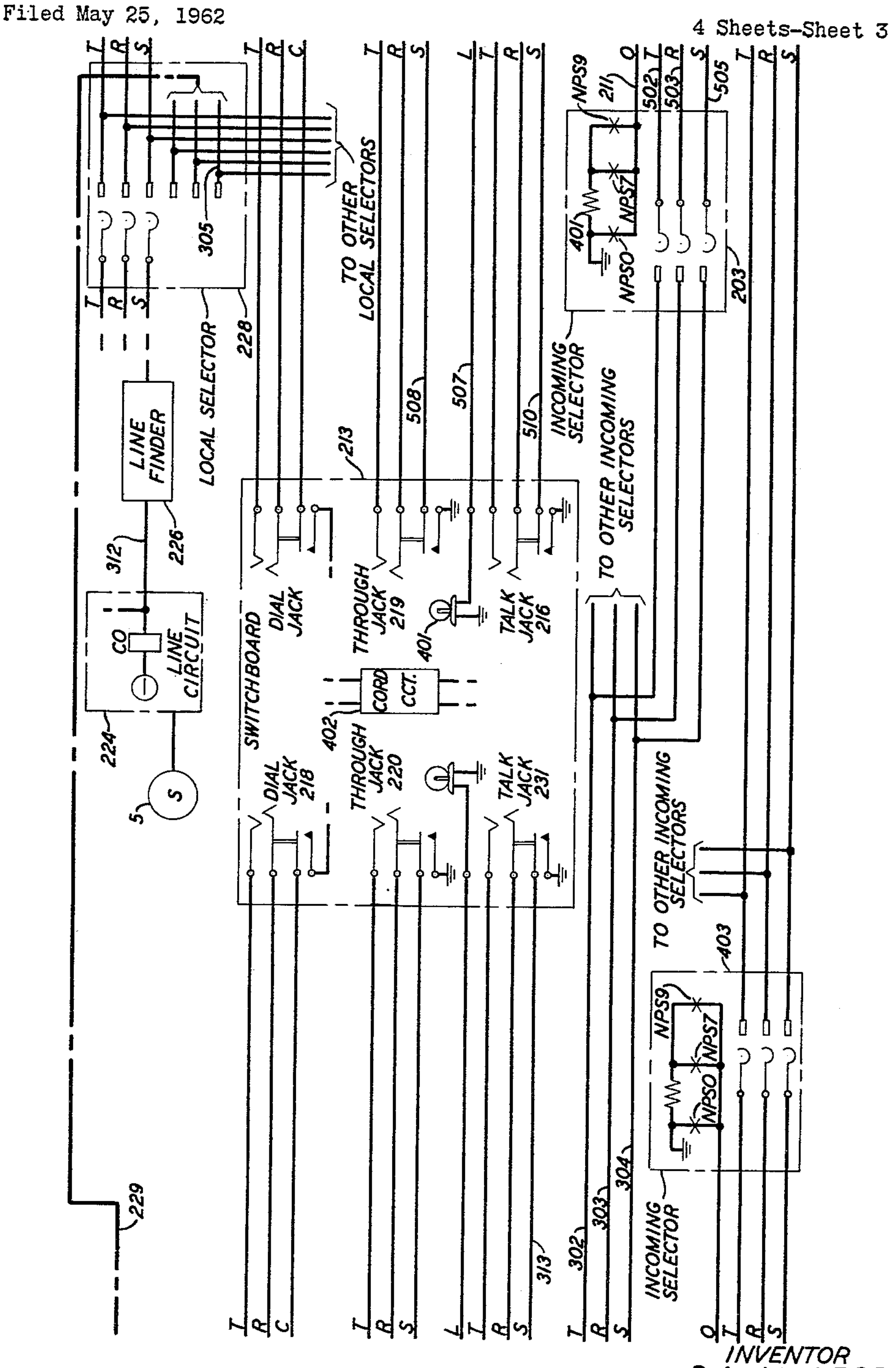
Figure 5:
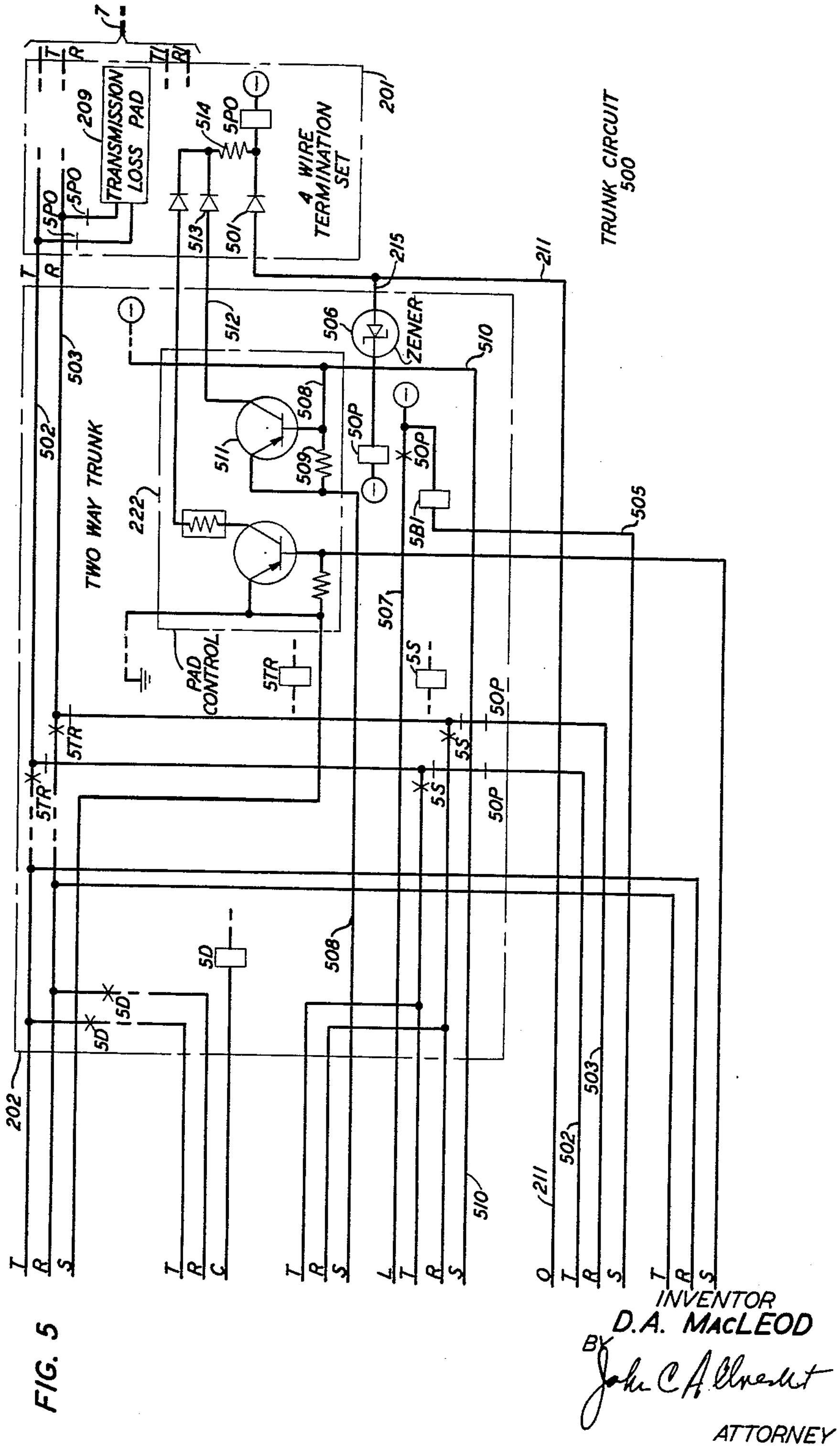

FIGS. 3, 4, and 5 illustrate the tip, ring, and sleeve conductor terminations of two identical typical two-way trunk circuits 300 and 500 in switching center 2. The circuit operations performed by a step-by-step switching center and its components in establishing incoming, outgoing, and tandem call connections are well known in the telephone art and it is felt unnecessary to include details thereof in this description. Therefore, only those circuit functions required to illustrate the present invention are described hereinbelow.

The numerical designations given to the equipment components shown in FIG. 2 are duplicated in FIGS. 3, 4, and 5 to designate the same components for purposes of consistency and clarity of description.

*Tandem Call—Automatic Completion—Incoming Portion*

A call incoming through trunk circuit 500 at switching center 2 over trunk 7 from switching center 1 is switched through incoming selector 203. The tip and ring conductors 502 and 503 are extended from four-wire termination set 201 to two-way trunk 202 and through break contacts of relays 5TR, 5S, and 5OP to the jack terminals of incoming selector 203. Responsive to call information received through trunk circuit 500 from switching center 1 indicating that the call is directed to station 6, incoming selector 203 selects a level, such as level 7, which is associated with trunks connecting switching centers 2 and 3. The normal post spring contact NPS7 is closed when level 7 is selected.

A high resistance ground signal is applied by incoming selector 203 to the control lead 211 in response to the closure of contact NPS7. This signal is extended from ground in incoming selector 203 through resistance 401, closed contact NPS7, over lead 211, through diode 501 in four-wire termination set 201 and through the winding of relay 5PO to battery. Relay 5PO operates over this circuit, opening its normally closed contacts and disconnecting the transmission loss pad 209 from the tip and ring conductors 502 and 503 of trunk 202. The pad 209 remains disconnected until relay 5PO is released in response to the release of incoming selector 203. Incoming selector 203 does not release until the calling station 4 disconnects.

The incoming selector 203 may also be arranged to generate a high resistance ground signal in response to the selection of other levels, such as level 9, which are associated with trunks connecting switching center 2 to other remote switching centers or with other circuits requiring the disconnection of transmission loss pad 209.

*Tandem Call—Automatic Completion—Outgoing Portion*

In switching a call originated from station 4 at switching center 1 which is directed to station 6 at switching center 3, switching center 2 establishes a tandem call connection from trunk 7 to trunk 8, as previously described. This tandem call connection extends from trunk 7 through trunk circuit 500, incoming selector 203, and trunk circuit 300 to trunk 8.

The circuit operations of a two-way trunk circuit in response to its seizure by a selector circuit in a step-by-step switching system are well known. The trunk circuit applies ground to its associated sleeve conductor, which terminates on the bank terminals of all selectors which may be used to seize the trunk circuit. This ground serves as a trunk-busy indication to other selectors, and to supervise the call connection as established through the seizing selector to the next preceding equipment component of the switching train. In a tandem call connection the next preceding equipmtnt component of the switching train is the trunk circuit through which the call entered the switching center. The trunk circuit further responds to seizure by an incoming selector by transferring its tip and ring conductors from their appearances on the associated incoming selector jack terminals to their appearances on the seizing incoming selector bank terminals.

As previously described, incoming selector 203 selects level 7 in response to call information indicating a call directed to station 6 at switching center 3. The incoming selector 203 then hunts for, and seizes an idle trunk circuit 300 whose tip, ring, and sleeve conductors 302, 303, and 304, respectively, terminate on the bank terminals of level 7 of incoming selector 203. Responsive to its seizure, trunk 206 of two-way trunk circuit 300 applies ground through its pad control circuit 212 to its sleeve conductor legs 304 and 305, which terminate on the bank terminals of incoming selector 203 and local selector 228, respectively, in addition to terminating on the bank terminals of other incoming and local selectors not shown. The ground applied to sleeve conductor leg 304 is extended through the bank termination of sleeve conductor leg 304 on incoming selector 203, the jack termination of lead 505 on incoming selector 203 and the winding of relay 5B1 to battery in trunk 202. Current then flows from ground in trunk 206 through pad control circuit 212 over sleeve conductor leg 304 to battery in trunk 202.

Pad control circuit 212 of trunk 206 comprises a resistor 306 in series with sleeve conductor leg 304 and a transistor 307 whose base and emitter elements are in shunt of resistor 306. The above-described current flow in sleeve conductor leg 304 produces a voltage drop across the resistor 306 which is sufficient to cause the transistor 307 to conduct, thereby producing current flow from the ground applied to sleeve conductor leg 304 through the collector of transistor 307. A circuit is then completed from ground on sleeve conductor leg 304 through the emitter and collector of transistor 307, thermistor 308, over conductor 309, through diode 310 in four-wire termination set 208, resistor 311 and the winding of relay 3PO, over which relay 3PO is operated. Relay 3PO, in operating, disconnects the associated transmission loss pad 210 from the tip and ring conductors 302 and 303, respectively, of the trunk 206 by opening its normally closed contacts. Pad 210 remains disconnected from the tip and ring conductors 302 and 303 of the trunk 206 until current ceases to flow in the sleeve conductor leg 304. The sleeve conductor leg 304 remains conductive until the switching train is broken as a result of disconnection by the calling station 4.

The voltage drop required across resistor 306 to cause transistor 307 to conduct is very small. The resistance required to produce this voltage drop is similarly small, and of considerably less magnitude than the resistance of the operating winding of a relay. The addition of resistor 306 in series with sleeve conductor leg 304 therefore does not adversely affect the usual control functions of the sleeve conductor by increasing its resistance beyond the allowable limit. The current through transistor 307 is also so slight that the sleeve conductor functions are not disturbed.

*Tandem Call—Operator Assistance*

It is now assumed that the call from station 4 at switching center 1 to station 6 at switching center 2 is switched through switching center 2 by an operator at switchboard 213.

The tip and ring conductors 502 and 503 of trunk 202 are normally connected to jack terminals of the associated incoming selector 203 through break contacts of relay 5TR, break contacts of relay 5S, and break contacts of relay 5OP. In response to call information incoming over the tip and ring conductors 502 and 503 of trunk 202 which indicates a call to an operator, incoming selector 203 selects a level, such as level O, associated with operator request calls. Responsive to the selection of level O, normal post spring contact NPS0 is closed, thereby generating a low resistance ground signal over lead 211. The low resistance ground signal is forwarded over lead 211 to four-wire termination set 201 through diode 501 and the winding of relay 5PO. Relay 5PO operates over this circuit and disconnects transmission loss pad 209 from the tip and ring conductors 502 and 503 of trunk 202. The leg 215 of lead 211, which extends to trunk 202, includes a zener diode 506 which is voltage responsive. Due to the relative resistances of resistor 401 in incoming selector 203 and the winding of relay 5PO in four-wire termination set 201, the voltage drop across the zener diode 506, which occurred due to the previously described application of a high resistance ground signal to lead 211, was insufficient to cause current to flow through the zener diode 506. However, since the resistor 401 in incoming selector 203 is not included in the low resistance ground signal path through contact NPS0, the voltage drop across zener diode 506 of trunk 202 is sufficient to cause current to flow through the zener diode 506 and operate relay 5OP. The circuit for operating relay 5OP therefore extends from ground in the incoming selector 203 through contact NPS0, over lead 211, over lead 215, through zener diode 506 and through the winding of relay 5OP to battery.

Relay 5OP, in operating, applies battery through its make contact to lead 507, which extends to the lamp 401 associated with talk-jack 216 at switchboard 213, thereby lighting lamp 401. Lamp 401 signals the operator at switchboard 213 that her assistance is desired in completing a call incoming through trunk 202.

Relay 5OP, in operating, opens its normally closed contacts in series with the tip and ring conductors 502 and 503, thereby disconnecting incoming selector 203 from trunk 202. The resulting release of incoming selector 203 opens contact NPS0, thereby removing the low resistance ground signal from lead 211, and opening the above-described operating circuit of relay 5PO in four-wire termination set 201. Relay 5PO is accordingly released, and transmission loss pad 209 is reconnected to the tip and ring conductors 502 and 503 of trunk 202.

As previously described, the operator at switchboard 213 responds to the lighting of lamp 401 by inserting the plug of a cord circuit 402 in talk-jack 216. The operator orally requests the call destination from the calling party and, upon ascertaining that the called station 6 is served by switching center 3, selects an idle trunk circuit 300 through which to forward the call to switching center 3.

The circuit operations of typical trunk circuit 300 in response to its seizure over dial-jack 218 will not be described herein as they are well known in the telephone art. The operator, upon completing her dialing function, utilizes another cord circuit, such as 402, to connect trunk circuit 500 to trunk circuit 300 by way of their respective through-jack appearances 219 and 220.

When the operator inserts the plug of cord circuit 402 into through-jack 219, ground is applied in the well known manner to the sleeve conductor leg 508 of trunk 212 which is associated with through-jack 219. This ground extends from switchboard 213 over sleeve conductor leg 508, through pad control circuit 222 to battery in trunk 202. Current then flows through the above-described circuit.

Pad control circuit 222 comprises a resistor 509 in series with sleeve conductor leg 508, and a transistor 511, whose emitter and base elements are in shunt of resistor 509. The current flow in sleeve conductor leg 508 produces a voltage drop across resistor 509 which is sufficient to cause transistor 511 to conduct, thereby producing current flow from the ground on sleeve conductor leg 508 through the collector of transistor 511. A circuit is then completed from ground on sleeve conductor 508 through the emitter and collector of transistor 511, over conductor 512, through diode 513 in four-wire termination set 201, resistor 514 and the winding of relay 5PO, over which relay 5PO is operated. Relay 5PO, in operating, disconnects the associated transmission loss pad 209 from the tip and ring conductors 502 and 503 of trunk 202 by opening its normally closed contacts. The pad 209 remains disconnected until current ceases to flow in the sleeve conductor leg 508. The sleeve conductor leg 508 remains conductive until the operator removes the plug of cord circuit 402 from the through-jack 219 to break to call connection.

The pad 210 is disconnected from the tip and ring conductors 302 and 303 of trunk 206 in a similar manner responsive to the insertion of the other plug of cord circuit 402 in through-jack 220 by the operator at switchboard 213.

*Locally Originated Call—Automatic Completion*

A call originated by station 5 which is directed to station 6 at switching center 3 is switched by switching center 2, as previously described, through line circuit 224, line finder 226, local selector 228, trunk 206, four-wire termination set 208 and over trunk 8 to switching center 3. In a manner similar to that previously described with reference to incoming selector 203, local selector 228 selects a level associated with trunks to switching center 3 in response to call information originated at station 5. Local selector 228 then hunts for and selects an idle trunk circuit, such as trunk circuit 500, which is terminated on the bank terminals of the selected level. In response to its seizure by local selector 228, trunk 206 operates relay 3TR which transfers the tip and ring conductors 302 and 303 from their normally connected appearances on the jack terminals of incoming selector 403 to the bank terminals of local selector 228. The operation of relay 3TR is not described herein as it is a normal function of typical step-by-step system two-way trunk circuits. In further response to seizure by local selector 228, trunk circuit 206 applies ground through pad control circuit 212 to the sleeve conductor legs 305 and 304 which terminate on the bank terminals of local selector 228 and incoming selector 203, respectively, in addition to other local and incoming selectors not shown. A circuit is then completed from battery in line circuit 224 through the winding of cutoff relay CO, over sleeve conductor 403, through line finder 226, the jack appearance of line finder 226 on local selector 228, the bank appearance of trunk 206 on local selector 228, over sleeve conductor leg 305 in cable 229, and through pad control circuit 212 to ground in trunk 206. Current flows through sleeve conductor leg 305 when the above-described circuit is established. Although ground is applied by the trunk 206 to sleeve conductor leg 305 through pad control circuit 212, there is no current flow in sleeve conductor leg 304, since no connection has been established through incoming selector 203.

The transistor 307 of pad control circuit 212 is connected in shunt of resistor 306 which is in series with sleeve conductor leg 304, and detects current flow in sleeve conductor leg 304 as a result of a voltage drop across resistor 306. In the absence of current flow in sleeve conductor leg 304 transistor 307 does not conduct, and, therefore, no signal is forwarded over lead 309 to operate relay 3PO in four-wire termination set 208. Transmission loss pad 210 therefore remains connected to the tip and ring conductors 302 and 303 of trunk 206.

The sleeve conductor leg 304 of trunk 206 appears on the bank terminals of incoming selector 203 and other incoming selectors not shown. In switching other calls which require the establishment of tandem call connections, the other incoming selectors may hunt for an idle trunk circuit in level 7, as previously described. As a result of this hunting operation, momentary current surges may occur in sleeve conductor leg 304 which would result in false operations of relay 3PO in four-wire termination set 208 and in false disconnection of transmission loss pad 210. Thermistor 308 insures that the current flow detected by transistor 307 in sleeve conductor leg 304 is continuous, and not merely a momentary surge produced by incoming selector hunting operations. If the current flow ceases before thermistor 308 permits the operation of relay 3PO, the transmission loss pad 210 will remain connected, thus avoiding the introduction of momentary transmission level distortion in a locally originating or terminating call.

*Locally Originating Call—Operator Assisted*

When a locally originated call is assisted in completion by an operator at switchboard 213, an idle trunk to the requested call destination is selected by the operator. It is assumed that the operator at switchboard 213 is originating a call to station 4 at switching center 1. The operator inserts the plug of a cord circuit 402 in the talk-jack 216 of trunk 202. Ground is connected in the well known manner to the sleeve conductor leg 510 of trunk 202 which terminates at talk-jack 216. This ground is extended over sleeve conductor leg 510 through pad control circuit 222 to battery in trunk 202. The pad control circuit 222 functions in a manner similar to that previously described for a locally originated automatically completed call to distinguish between the present current flow in sleeve conductor leg 510 associated with talk-jack 216 and the previously described current flow in sleeve conductor leg 508 associated with through-jack 219. In the absence of current flow through resistor 509 the transistor 511 does not conduct, and no current flows through the collector over lead 512 to operate relay 5PO in four-wire termination set 201. The transmission loss pad 209 therefore remains connected to the tip and ring conductors 502 and 503 of trunk 202.

*Locally Terminating Call—Automatic Completion*

It is now assumed that a call from station 4 is directed to station 5 at switching center 2. The call enters switching center 2 through trunk 202, and the tip and ring conductors 502 and 503 thereof are extended, as previously described, to incoming selector 203. In response to call information received through trunk 202, incoming selector 203 selects a level associated with a local connector, such as local connector 234. The normal post spring contact associated with the selected level on the incoming selector switch of incoming selector 203 is not arranged to generate either a high or a low resistance ground signal over lead 211. The transmission loss pad 209 therefore remains connected to the tip and ring conductors 502 and 503 of trunk 202.

*Locally Terminating Call—Operator Assisted*

It is now assumed that the call from station 4 at switching center 1 is directed to the operator at switchboard 213 in switching center 2. As previously described, in response to call information incoming through trunk 202, incoming selector 203 selects level O which is associated with operator request calls. The normal post spring contact NPS0 of the incoming selector switch in incoming selector 203 is closed, and the previously described low resistance ground signal is generated over lead 211. The pad 209 is disconnected from the tip and ring conductors 502 and 503 of trunk 202 in response to the low resistance ground signal, and relay 5OP in trunk circuit 202 is operated over lead 215 through zener diode 506, as previously described. The operator at switchboard 213 responds to the lighting of lamp 401 by inserting the plug of a cord circuit 402 into talk-jack 216. The operator then proceeds to orally ascertain the local call destination and to establish a connection from talk-jack 216 to the called local station 5. Ground is applied to sleeve conductor leg 510 of trunk 202 and extended through pad control circuit 222 to battery. Pad control circuit 222 functions in a manner similar to that described above for the locally terminating automatically completed call to distinguish between current flow in sleeve conductor leg 510 and current flow in sleeve conductor leg 508 allowing the pad 209 to remain connected.

Although the above description refers to a step-by-step switching system it is to be understood that the above-described arrangements are merely illustrative of the application of the principles of the invention. The invention is equally applicable to other types of switching systems. Numerous other arrangements may be devised by those skilled in the art without departing from the spirit and scope of the invention.

What is claimed is:

1. A telephone switching system comprising a trunk circuit having a transmission loss pad normally connected to the talking conductors thereof and a control lead divorced from said talking conductors, means for establishing a tandem call connection to said trunk circuit and for producing current flow in said control lead, and pad control means for effecting the disconnection of said transmission loss pad from said talking conductors of said trunk circuit in response to said current flow in said control lead, said pad control means including a current sensitive electronic device.

2. A telephone switching system in accordance with claim 1 wherein said current sensitive electronic device comprises a transistor having its base and emitter elements in series with said control lead and a resistor in shunt of said base and emitter elements of said transistor.

3. A telephone switching system in accordance with claim 2 further comprising means for preventing false disconnection of said transmission loss pad due to momentary current flow in said control lead, said last-named means connected in series with said collector element of said transistor.

4. A telephone switching system in accordance with claim 3 wherein said last-named means comprises a thermistor.

5. A telephone switching system comprising a first trunk circuit having a transmission loss pad normally connected to the talking conductors thereof and a control lead divorced from said talking conductors, a second trunk circuit, means for establishing a tandem call connection between said first and second trunk circuits and for producing current flow in said control lead, and means including a current sensitive electronic device in series with said control lead and responsive to said current flow in said control lead for effecting the disconnection of said transmission loss pad from said talking conductors of said first trunk circuit.

6. A telephone switching system comprising a first trunk circuit having a transmission loss pad normally connected to the talking conductors thereof and a control lead divorced from said talking conductors, said control lead having a first and a second leg, a second trunk circuit, a line circuit associated with a local subscriber station, means for establishing a tandem call connection between said first and second trunk circuits and for producing current flow in said first leg of said control lead, means for establishing a local call connection between said first trunk circuit and said line circuit and for producing current flow in said second leg of said control lead, and electronic pad control means responsive only to said current flow in said first leg of said control lead for effecting the disconnection of said transmission loss pad from said talking conductors of said first trunk circuit.

7. A telephone switching system comprising a trunk circuit having a transmission loss pad normally connected to the talking conductors thereof, an incoming selector circuit, a local selector circuit, a sleeve conductor associated with said first trunk circuit having a first leg extending to said incoming selector circuit and a second leg extending to said local selector circuit, electronic pad control means comprising a transistor having its base and emitter elements in series with said first leg of said sleeve conductor and a resistor in shunt of said base and emitter elements of said transistor, and said transistor responsive only to current flow in said first leg of said sleeve conductor to produce current flow through the collector element of said transistor and thereby effect the disconnection of said transmission loss pad from said talking conductors of said trunk circuit.

8. A telephone switching system in accordance with claim 7 further comprising means for preventing false disconnection of said transmission loss pad due to momentary current flow in said control lead, said last-named means comprising a thermistor connected in series with said collector element of said transistor.

9. A telephone switching system comprising a switchboard, a trunk circuit having a transmission loss pad normally connected to the talking conductors thereof, a tandem call signal source, an operator request signal source, means for selectively connecting both said signal sources to said trunk circuit in accordance with call information received through said trunk circuit, means in said trunk circuit responsive to a signal from said tandem call signal source and to a signal from said operator request signal source to effect the disconnection of said transmission loss pad from said talking conductors thereof, and means including a voltage responsive electronic device responsive only to said signal from said operator request signal source to disconnect both said signal sources from said trunk for effecting the reconnection of said transmission loss pad to said talking conductors of said trunk circuit.

10. A telephone switching system in accordance with claim 9 further comprising means including said electronic device responsive to said signal from said operator request signal source to effect the generation of an operator alerting signal from said trunk circuit to said switchboard.

11. A telephone switching system in accordance with claim 9 further comprising a control lead over which said operator request signal and said tandem call signal are generated, said control lead having a first and a second leg, and wherein said voltage responsive electronic device comprises a zener diode in series with said second leg of said control lead, said tandem call signal source comprises a connection to ground potential through a high resistance, said operator request signal source comprises a direct connection to ground potential, said zener diode is effective to exclude from said second leg of said control lead a high resistance ground signal from said tandem call signal source and to admit to said second leg of said control lead a direct ground signal from said operator request signal source, said trunk circuit is responsive to said high resistance ground signal and to said direct ground signal received over said first leg of said control lead to effect the disconnection of said transmission loss pad from said talking conductors thereof, and said trunk circuit is responsive to said direct ground signal received over said second leg of said control lead to disconnect both said signal sources thereby removing said direct ground signal from said first leg of said control lead and effecting said reconnection of said transmission loss pad to said talking conductors of said trunk circuit.

12. A telephone switching system comprising a two-way trunk circuit having a transmission loss pad normally connected to the talking conductors thereof, a sleeve conductor associated therewith and a control lead associated therewith; means for establishing a tandem call connection to said trunk circuit and for producing current flow in said sleeve conductor; pad control means including a current sensitive electronic device and pad disconnect means, said pad control means responsive to said current flow in said sleeve lead to enable said pad disconnect means, a tandem call signal source, means for establishing a tandem call connection from said trunk circuit and for connecting said tandem call signal source to said control lead, and means responsive to a signal over said control lead from said tandem call signal source for enabling said pad disconnect means.

13. A telephone switching system in accordance with claim 12 further comprising an operator request signal source, a voltage responsive electronic device connected to said control lead, and means for connecting said control lead to said operator request signal source in accordance with call information received through said trunk circuit, said pad disconnect means enabled by a signal over said control lead from said operator request signal source, said voltage responsive electronic device responsive to said signal from said operator request signal source to effect the disablement of said last mentioned connecting means thereby removing said signal from said operator request signal source from said control lead, said pad disconnect means disabled by said removal of said signal from said operator signal source from said control lead.

14. A telephone switching system comprising a first two-way trunk circuit having a transmission loss pad normally connected to the talking conductors thereof, a sleeve conductor associated therewith and a control lead associated therewith; a second two-way trunk circuit, means for establishing a first tandem call connection from said first trunk circuit to said second trunk circuit in accordance with call information incoming through said first trunk circuit, a tandem call signal source, first connecting means responsive to said call information for connecting said tandem call signal source to said control lead, pad disconnect means responsive to a signal over said control lead from said tandem call signal source to disconnect said transmission loss pad from said talking conductors of said first trunk circuit, means for establishing a second tandem call connection from said second trunk circuit to said first trunk circuit in accordance with call information incoming through said second trunk circuit and for producing current flow in said sleeve conductor, a current sensitive electronic device connected in series with said sleeve conductor and responsive to said current flow in said sleeve conductor for controlling said pad disconnect means to disconnect said transmission loss pad from said talking conductors of said first trunk circuit, an operator request signal source, second connecting means responsive to call information incoming through said first trunk circuit for connecting said control lead to said operator request signal source, said pad disconnect means responsive to a signal over said control lead from said operator request signal source to disconnect said transmission loss pad from said talking conductors of said first trunk circuit, a voltage responsive electronic device connected to said control lead, and responsive to said signal from said operator request signal source to disable said second connecting means, said pad disconnect means responsive to said disablement of said second connecting means to reconnect said transmission loss pad to said talking conductors of said first trunk circuit.

15. A telephone switching system comprising a first trunk circuit having a transmission loss pad normally connected to the talking conductors thereof, a second trunk circuit, said first trunk circuit comprising pad control means including a current sensitive electronic device, a control lead having a voltage sensitive electronic device connected thereto and a pad disconnect relay, a sleeve conductor associated with said first trunk circuit, an operator request signal source, a tandem call request signal source, said current sensitive electronic device responsive to current flow in said sleeve lead to effect the operation of said pad control relay, said pad control relay operable in response to a signal from said operator request signal source over said control lead, said pad control relay operable in response to a signal from said tandem call signal source over said control lead, said voltage responsive electronic device responsive only to said signal from said operator request signal source to disconnect both said signal sources, said pad disconnect relay arranged to release in response to said disconnection of said signal sources, said pad disconnect relay effective in its operated state to disconnect said transmission loss pad from said talking conductors of said first trunk circuit, said pad disconnect relay effective in its released state to connect said transmission loss pad to said talking conductors of said first trunk circuit.

16. A two-way trunk circuit comprising talking conductors, control conductors, a transmission loss pad connectable to said talking conductors, and means for controlling the connection of said pad to said talking conductors, said means including means responsive to a high resistance ground control signal on one of said control conductors for disconnecting said pad from said conductors, means including a transistor responsive to a control signal on a second of said control conductors for disconnecting said pad from said conductors, and means including a voltage breakdown device connected to said one control conductor and responsive to a low resistance ground control signal thereon for removing control signals from said one control conductor to reconnect said pad to said talking conductors.

17. A telephone system comprising a two-way trunk circuit including talking conductors, control conductors, and a transmission loss pad connectable to said talking conductors; means for automatically establishing talking connections including said trunk circuit; operator means for establishing talking connections through said trunk circuit; and means for controlling the connection of said pad to said talking conductors, said last mentioned means including means responsive to a high resistance ground control signal from said automatic means on one of said control conductors for disconnecting said pad from said talking conductors, means including a first transistor responsive to a control signal on a second of said control conductors from said automatic means for disconnecting said pad from said talking conductors, means including a second transistor responsive to a control signal on a third of said control conductors from said operator means for disconnecting said pad from said talking conductors, and means including a voltage breakdown device connected to said one control conductor and responsive to a low resistance ground control signal from said automatic means for reconnecting said pad to said talking conductors.

No references cited.